Feb. 3, 1942. H. H. COUCH 2,271,629
SYNCHRONIZING MECHANISM
Filed Aug. 7, 1940 5 Sheets-Sheet 1

INVENTOR
HOWARD H. COUCH
BY Edgar H. Snodgrass
Wade Koontz
ATTORNEYS

Feb. 3, 1942. H. H. COUCH 2,271,629
SYNCHRONIZING MECHANISM
Filed Aug. 7, 1940 5 Sheets-Sheet 2

INVENTOR
HOWARD H. COUCH

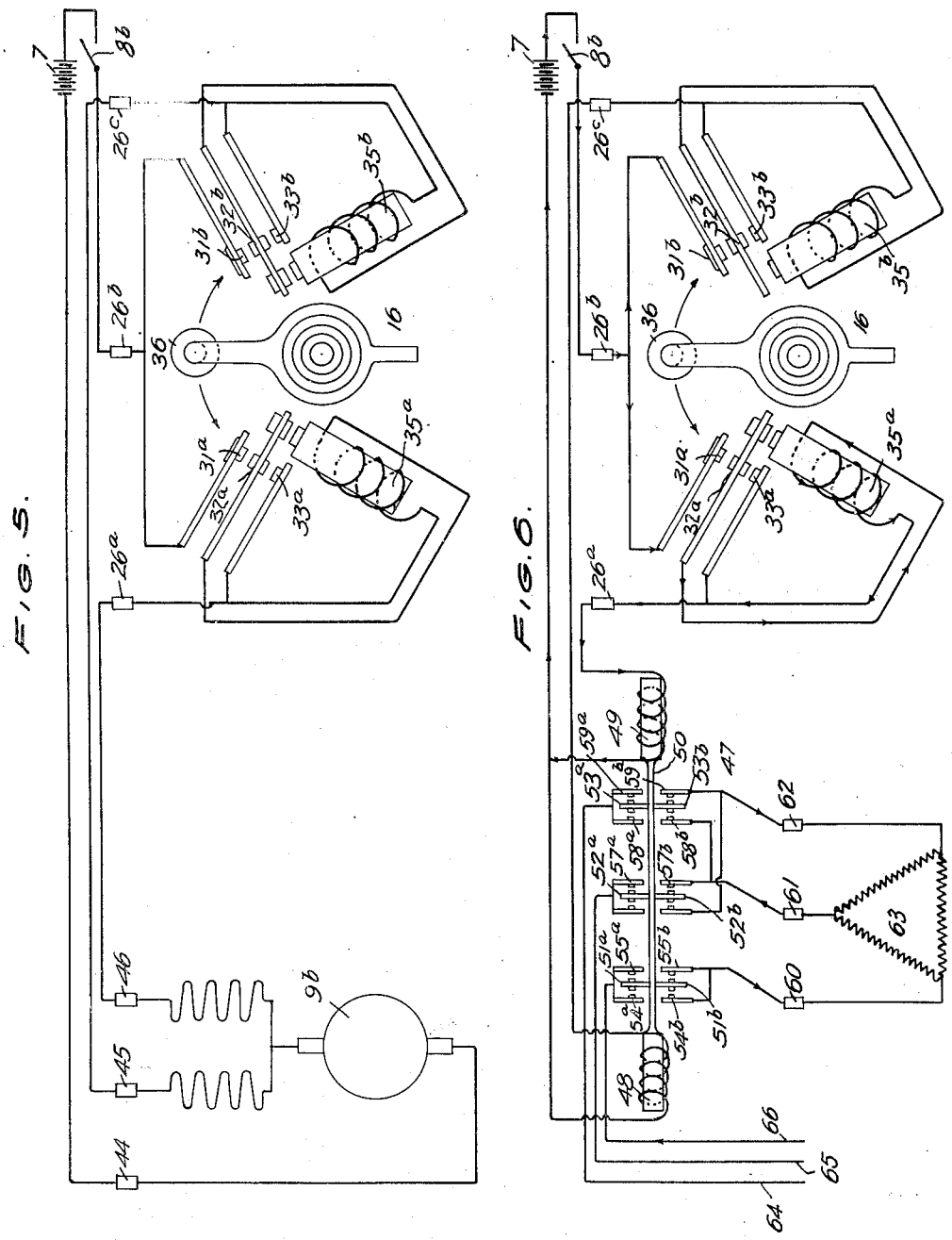

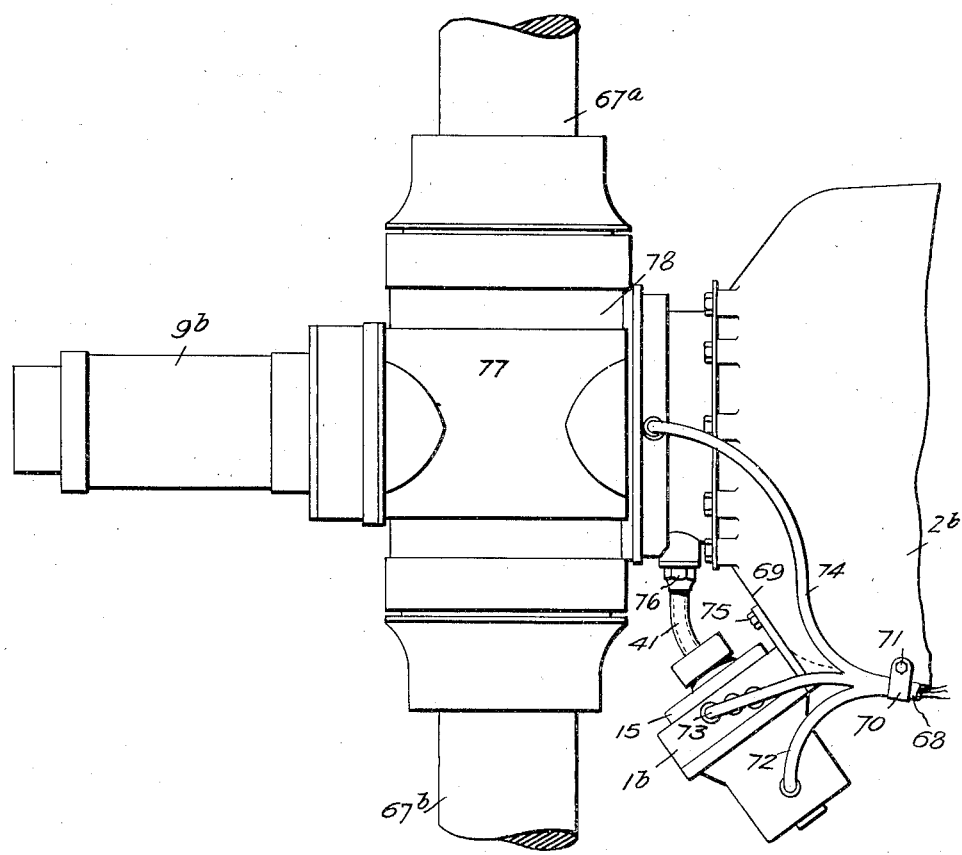

Feb. 3, 1942.   H. H. COUCH   2,271,629
SYNCHRONIZING MECHANISM
Filed Aug. 7, 1940   5 Sheets-Sheet 5
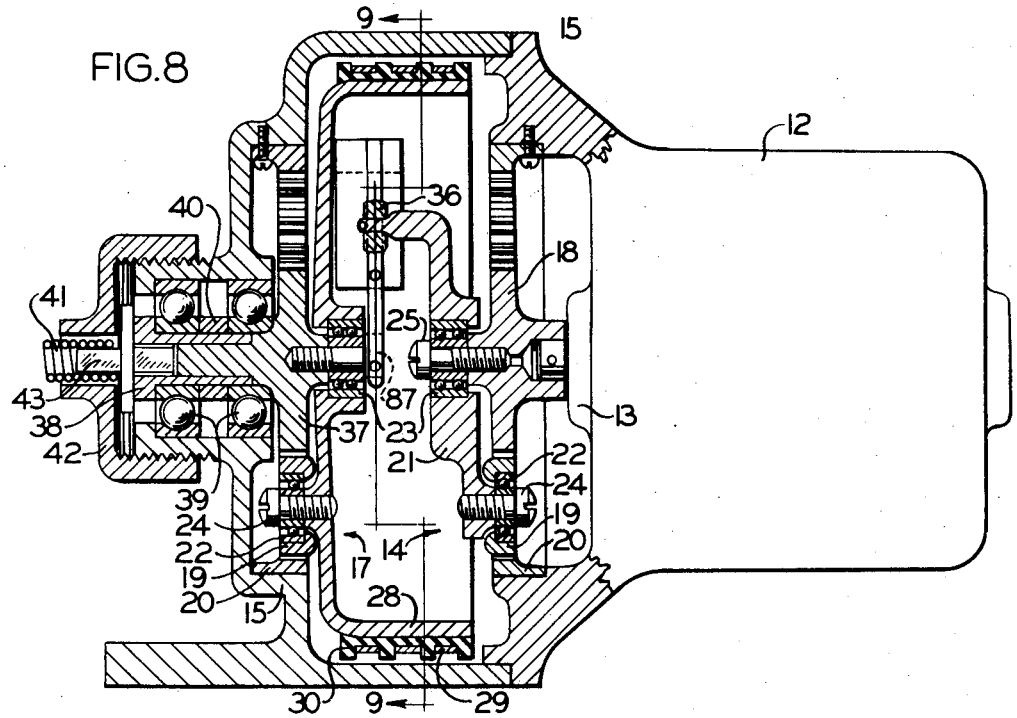
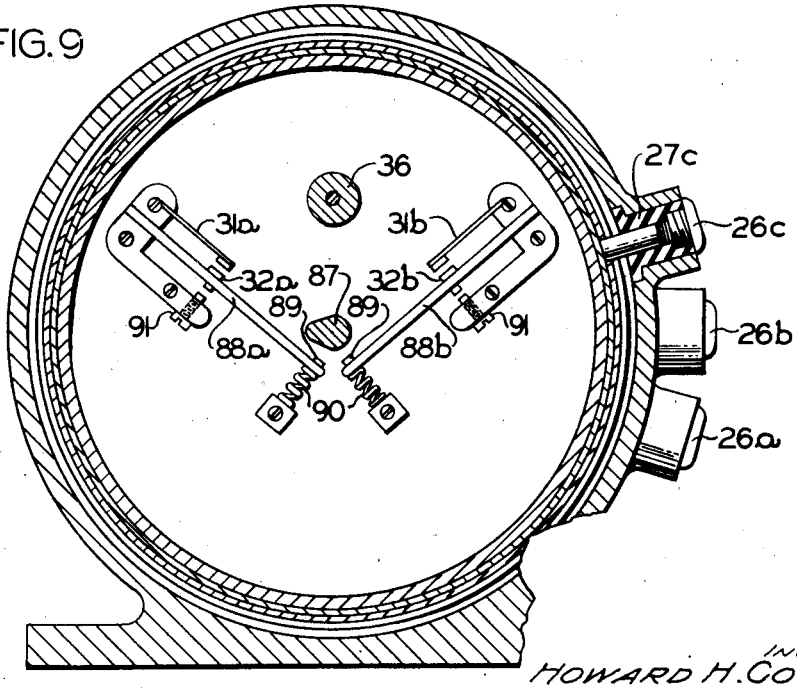

Patented Feb. 3, 1942

2,271,629

UNITED STATES PATENT OFFICE 2,271,629

SYNCHRONIZING MECHANISM

Howard H. Couch, Patterson Field, Ohio

Application August 7, 1940, Serial No. 351,668

11 Claims. (Cl. 170—135.6)

(Granted under the act of March 3, 1883, as amended April 30, 1928; 370 O. G. 757)

The invention described herein may be manufactured and used by or for the Government for governmental purposes, without the payment to me of any royalty thereon.

It is an object of my invention to synchronize a plurality of prime movers which during normal operation may vary in revolutions per unit of time from one another or from a master speed of rotation device.

This application forms a continuation in part of my application Serial No. 168,024, filed October 8, 1937, entitled "Synchronizing mechanisms."

More specifically, my invention relates to apparatus for synchronizing a plurality of such prime movers as those encountered in multiengined aircraft power plants in order to reduce to a minimum structural vibrations and auditory fatigue caused by the operation of the engines of such power plants out of synchronism.

It is well known to those skilled in the art that aircraft employing multiengined power plants having more than one propeller are subject to a very disagreeable "beat" or drumming noise whenever one or more engines rise above or fall below the operating revolutions of the power plant as a whole. The aforesaid phenomena subjects the personnel operating the aircraft to severe auditory fatigue and may set up destructive vibrations in the aircraft structure itself.

In aircraft employing only two propellers, it is a comparatively simple matter to eliminate "beat" phenomena due to engine revolution inequalities, by merely varying the speed of revolution of one of the aforesaid engines until the "beat" disappears. However, when three or more propellers are employed, it will be readily seen that elimination of the "beat" phenomena becomes a highly complicated matter because of the fact that it is extremely difficult for operating personnel of the aircraft to tell which propellers are causing the "beat." Previously, therefore, this difficulty has proven a serious drawback to the extended use of airplanes having three or more independently driven propellers, particularly for use in carrying passengers. The safety feature introduced by the greater number of independently driven propellers, however, is extremely desirable.

It is, of course, possible to set engine revolutions approximately the same by using the tachometers attached to each engine, but it is impossible with tachometers alone to set engine revolutions close enough to a master revolution indicator to eliminate the objectionable "beat" referred to above.

It is, therefore, a further object of my invention to synchronize a plurality of aircraft engines to operate at any desired speed of rotation by changing propeller blade angles automatically. I thereby relieve the pilot of all necessity for manual adjustment of the blade angles of controllable pitch propellers, while at the same time equally relieving him of the further necessities of manually adjusting individual engine throttles or individual engine governors substituted for said engine throttles. It is only necessary for the pilot to set the master speed of revolution device at the desired revolutions per minute and open the throttles of all engines until the desired manifold pressure therefor is obtained.

A still further object of my invention is to provide a synchronizing mechanism which will apply automatically gradual propeller blade angle changes for relatively small deviations from absolute engine synchronism, on the one hand, and rapid propeller blade angle changes for appreciable deviations from absolute synchronism, on the other hand. I am familiar with past efforts of inventors to obtain multiengine synchronism through employment of both electrical and hydraulic control mechanisms. All those efforts, however, under full scale testing conditions developed serious over-control characteristics.

Another object of my invention is to provide an aircraft engine synchronizing mechanism of such a character that the pitch-changing motor installed upon the forward propeller face of the engine to be synchronized may be greatly reduced in size and weight, thus markedly decreasing tendency of the combined motor and propeller to "whip" about their nearest point of engine support.

It is a still further object of my invention to reduce to a minimum the effectiveness of antiaircraft operation by substantially eliminating that "beat" phenomena which so materially aids sound-locating devices utilized in finding enemy aircraft.

Another object of my invention is the provision in synchronizing apparatus of the character described of a means for interrupting the supply of power to the propeller-pitch-changing means upon the occurrence of a relatively small speed difference between the engine associated with the propeller and a constant speed reference means and to continuously supply power to said pitch-changing means upon the occurrence of a speed difference of greater magnitude or duration.

Other objects and advantages of my invention will become apparent from the following description, taken in connection with the accompanying drawings, it being clearly understood that the same are by way of illustration and example only, and are not to be taken as in any way limiting the spirit or scope of my invention. The spirit and scope of my invention is to be limited only by the prior art and by the terms of the appended claims.

Referring to the drawings, in which numerals of like character designate similar parts throughout the several claims:

Figure 5 is a circuit diagram illustrating the operating principle of the synchronizing device and electric control system as applied to a propeller in which the pitch change is accomplished by a direct current motor;

Figure 6 is a circuit diagram illustrating the principle of operation employed when an A. C. motor is used to actuate the pitch-changing mechanism of the propeller;

Figure 7 shows application of the synchronizing device of Figures 3 and 4 to an electrically operated variable pitch propeller;

Figure 8 illustrates, partly in section, a modified form of synchronizer unit employing a mechanically actuated interrupter; and Figure 9 is a sectional view taken on line 9—9 of Figure 8.

Figure 1:
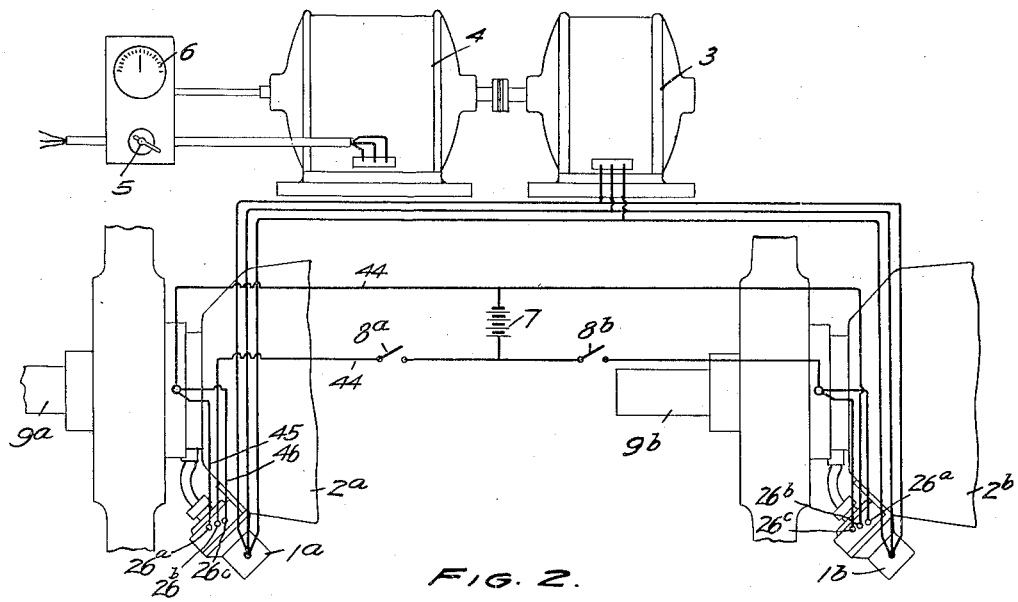
Figure 1 shows diagrammatically the electrical equipment required when direct current is utilized to drive the alternators operating the synchronizer units controlling propeller pitch change.
Figure 2:
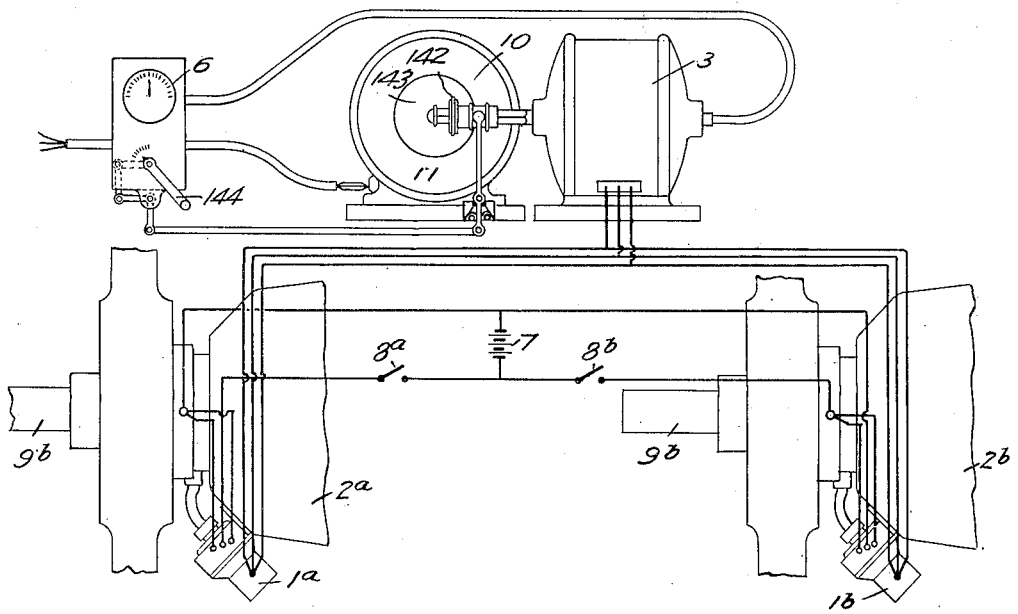
Figure 2 shows diagrammatically the electrical equipment required when alternating current is utilized to drive the alternators operating the synchronizer units controlling pitch change.

Figures 1 and 2 show in diagrammatical form the electrical equipment required when either a direct or an alternating current source is available to drive the alternators operating the synchronizer units controlling propeller pitch change of a multiengined power plant. Synchronizer units 1a and 1b, mounted upon the forward ends of aircraft engines 2a and 2b, are jointly connected with an alternator 3. In Figure 1, the alternator 3 is driven by a direct current motor 4, regulated in speed by a rheostat 5 and a tachometer 6. A switching portion of each synchronizer unit is interconnected with a battery 7, a switch 8a or 8b, and a propeller-pitch-changing motor 9a or 9b. In Figure 2, the alternator 3 is connected to a speed-reducing mechanism 11 driven by an alternating motor 10. The mechanism 11 is composed of a driven disk 142 adapted to be laterally varyingly adjusted across the face of a driving disk 143 mounted upon the near end of the motor 10. It is manually remotely controlled by means of a lever 144 mounted upon the support carrying the tachometer 6. It is well to note at this point that mechanical tachometers read within "fifteen" and electrical tachometers read within "fifty" revolutions of the true turning rate of the motor to which they are applied, while as little as a "five" revolutions difference in the turning rates of multi-engined power plants will produce the "beat" phenomena referred to above.

Enlarged cross-sectional views of the two synchronizer units discussed above are shown in Figures 3 and 4. Each is composed of a housing portion 12, encasing an alternating current motor 13 and an epicyclic gear mechanism 14, and a complementary housing portion 15, encasing a current switching device 16 and a second epicyclic gear mechanism 17. The gear mechanism 14 is composed of a sun pinion 18, a planet pinion 19, an internal gear 20, an arm carrier 21, ball bearings 22 and 23, and retaining screws 24 and 25. The current switching device 16 consists of three brushes 26a, 26b, and 26c secured in insulators 27a and 27b (not shown) and 27c fixed to the housing 15; a drum 28; three slip rings 29 secured in an insulator 30 fixed to the drum 28; resiliently mounted contact points 31a and 31b, 32a and 32b, 33a and 33b, and iron bars 34a and 34b, all operably associated with solenoid coils 35a and 35b and fixed to the inner flange surface of the drum 28, and a collar 36 of insulating material carried by an L-shaped member projecting from the base of the arm carrier 21. The gear mechanism 17 is made up of a sun pinion 37, the planet pinion 19, the internal gear 20, the ball bearings 22 and 23 and the retaining screws 24 and 25. It will be noted that the drum 28 performs the same function as the arm carrier 21 of the gear mechanism 14. The sun pinion 37 is carried by a driving sleeve 38 provided with a square inner bore and supported in the housing 15 by means of ball bearings 39 and a spacer sleeve 40. The driving sleeve 38 is connected to an engine to be synchronized, by means of a flexible shaft 41 provided with a retaining collar 42 and square-tipped driving end 43.

The diagram for the internal wiring of the synchronizer unit shown in Figures 1, 2, 3, 4, and 7 is presented in Figure 5. The contact points 31a and 31b (of the current switching device 16) have common connection with the brush 26b. The remaining brushes 26a and 26c have common connection, respectively, with one lead of the solenoid coil 35a and the contact point 33a, then one lead of the solenoid coil 35b and the contact point 33b. The remaining leads of the solenoids 35a and 35b are connected, respectively, with contact points 32a and 32b. The brushes 26a and 26c are further directly (and externally) connected, respectively, with lead wires 46 and 45 of the pitch-changing motor 9b. The remaining brush 26b is connected to a lead wire 44 of the motor 9b through the switch 8b and the battery 7.

The operation of the above-described form of synchronizer may now be disclosed.

Figure 3:
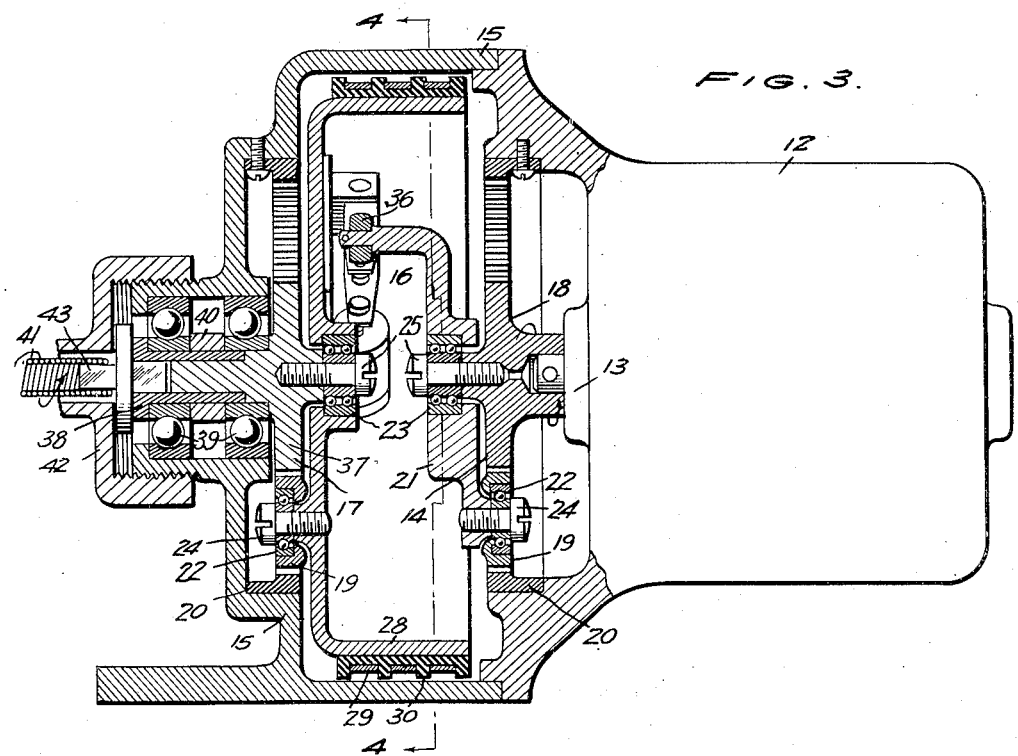
Figure 3 is a view in partial cross-section illustrating the synchronizing device and electric control system as applied to an electrically operated propeller or a mechanically operated propeller in which the pitch-changing mechanism can be operated electrically by motor or solenoids.
Figure 4:
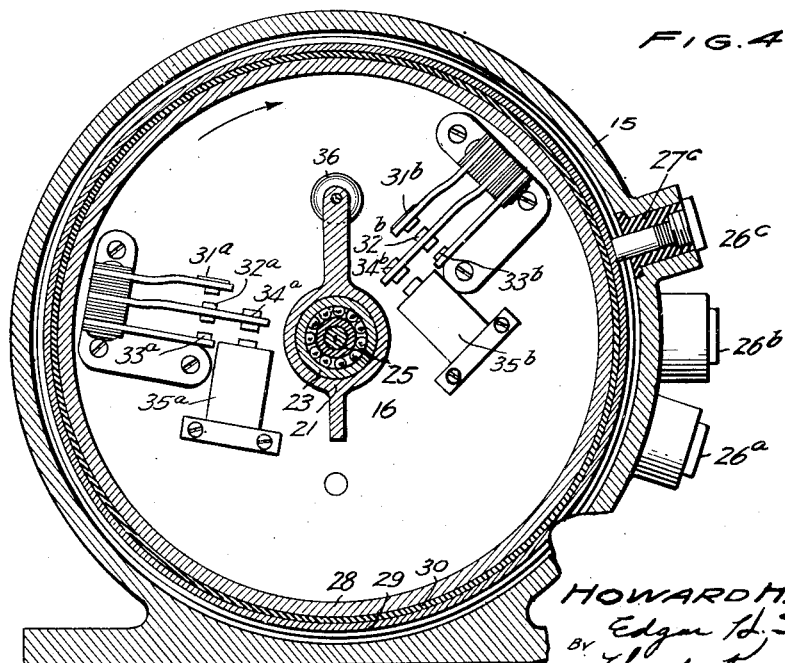
Figure 4 is a cross-sectional view taken on the line 4—4 of Figure 3.

Let it be assumed that the aircraft engine 2b of Figure 1 is started and brought up to a desired operating speed, resulting in clockwise revolution of the drum 28, as viewed in Figures 3 and 4. The alternating current motor 13 will thereupon be driven in a like clockwise direction through continuing physical contact between the contact point 31a of the current switching device 16 and the collar 36 of the epicyclic gear mechanism 14. Let it next be assumed that the alternator 3 of Figure 1 is started and brought up to an operating speed which will drive the motor 13 of Figures 3 and 4 in a clockwise direction at a speed just slightly less than that maintained by the clockwise-turning flexible shaft 41 driven by the aircraft engine 2b. Physical contact between the contact point 31a and the collar 36 will still remain uninterrupted. If, however, the alternator 3 is momentarily speeded up, the aforesaid physical contact will be broken. Continued speeding up of the alternator 3 will thereafter cause appreciable relative movement between the drum 28 and the collar 36, and bring the latter into physical contact with the contact point 31b, whereupon both the motor 13 and the flexible shaft 41 will jointly impart a clockwise turning moment to the drum 28.

The above-enumerated positionings of the collar 36, with respect to the current switching device 16, are taken advantage of in the following manner: Assuming in all cases that the speed of the motor 13 is a fixed multiple of desired engine speed and that the switch 8b of Figure 5 is closed, slight over-speeding of the engine 2b will cause gentle closing of contact points 31a and 32a, whereupon the solenoid coil 35a immediately performs the function of a "kick" or "interrupter" coil. The nature of the resulting current flow from the battery 7 through the now "interrupter" coil 35a to lead wire 44 and 46 of the pitch-changing motor 9b is that of current flowing through any well-known "kick coil"; i. e., there is just sufficient flow interruption to provide current of a character which will cause slight or delayed increase in propeller blade pitch. The aforesaid increase is so regulated as to bring about sufficient decrease in engine revolutions to assure synchronization of the engine 2b with the motor 13. On the other hand, marked over-speeding of the engine 2b will cause complete closing of contact points 31a, 32a, and 33a, resulting in direct connection of the battery 7 with lead wires 44 and 46, thereby effecting marked increase in the rate at which the propeller blade pitch is changed. With decreased engine speed, the collar 36 frees itself from contact with the contact point 31a. Slight under-speeding of the engine 2b will cause closing of contact points 31b and 32b, whereupon current of the "kick coil" characteristics enumerated above will flow from the battery 7 to lead wires 44 and 45, causing the aforesaid slight decrease in propeller blade pitch. Marked under-speeding of the engine 2b will cause complete closing of contact points 31b, 32b, and 33b, resulting in direct connection of the battery 7 with lead wires 44 and 45, and marked decrease in the rate at which the propeller blade pitch is changed. With increased engine speed, the collar 36 again frees itself from contact with the contact point 31b. Just how much angular freedom the collar 36 should have before it is brought into physical contact with the current switching device 16 is a matter to be determined by experimentation. The same applies as to physical spacing of the contact points. Through repeated "contactings" and "breakings" of the collar 36 with the contact points 31a and 31b, the engine 2b is constantly maintained at a desired number of revolutions per minute.

In Figure 6, functioning of the current switching device 16 is identical in character to the functioning described in the preceding paragraph. However, the lead wires 44, 45, and 46 of the pitch-changing motor 9b are replaced by solenoid coils 48 and 49 of an alternating current switching device 47. The device 47 is provided with a draw bar 50, operably connected with the solenoid coils 48 and 49. Three pairs of oppositely disposed contact points 51a—51b, 52a—52b, and 53a—53b, are fixed to the draw bar 50. On both sides of the aforesaid oppositely disposed contact points are equally spaced and oppositely disposed contact points 54a—54b, 55a—55b, 56a—56b, 57a—57b, 58a—58b, and 59a—59b. Contact points 54b—55b, 56b—59b, and 57b—58b have common connection, respectively, with lead wires 60, 62, and 61 of an alternating current motor 63. On the other hand, contact points 54a—55a, 56a—57a, and 58a—59a have common connection, respectively, with lead wires 66, 65, and 64 of an alternating current source of power not shown. Returning momentarily to the current switching device 16, closing of contact points 31a and 32a causes current of the "kick coil" characteristics enumerated in the preceding paragraph to flow from the battery 7 through the solenoid coil 49, with resultant right-hand movement of the draw bar 50. Thereafter, alternating current from the lead wires 64, 65, and 66 will flow, respectively, to lead wires 62, 61, and 60 of the alternating current motor 63. On the other hand, closing of contact points 31b and 32b of the current switching device 16 will cause like current flow through the solenoid coil 48, with resultant left-hand movement of the draw bar 50. Thereafter, alternating current from the lead wires 64, 65, and 66 will flow, respectively, to lead wires 61, 62, and 60 of the alternating current motor 63. The pitch-changing functions of the motors 9b and 63 are identical.

Figure 7 shows a well-known electrically operated variable pitch propeller 77 installed upon the forward end of an aircraft engine 2b. The propeller 77 consists of a propeller-pitch-changing motor 9b (previously shown in Figures 1 and 2) fixed to a hub portion 78 containing the requisite mechanism for varying the pitch angles of propeller blades 67a and 67b. A main wire conduit 68, fixed to a crankcase 69 of the engine 2b by means of a clip 70 and cap screw 71, is provided for housing the wiring schemes of either Figure 1 or Figure 2. A conduit branch 72 connects the alternator 3 with the small alternating current motor 13 encased within the housing portion 12. Further conduit branches 73 and 74 are provided for additional electrical interconnection of the battery 7, the current switching device 16, and the propeller-pitch-changing motor 9b in the manner indicated in Figures 1 or 2 and in Figure 5. The housing portion 15 of the synchronizer unit 1b is fixed to the lower forward end of the crankcase 69 by means of cap screws 75, while the flexible shaft 41 operating the current switching device 16, is connected to the engine 2b by means of a retaining nut 76. The operation details of the above embodiment of my invention have heretofore been fully disclosed.

Figures 8 and 9 illustrate a modified form of synchronizer unit not disclosed in my aforementioned application Serial No. 168,024, but similar to the device of Figures 3 and 4 except that the solenoid-actuated interrupter is replaced by a mechanical circuit interrupter, and parts similar to the structure illustrated in Figures 3 and 4 are indicated by the same reference numerals.

The driving sleeve 38 carries a cam 87 at its outer end, which is secured to the sleeve by a threaded extension which is journalled in the bearing 23. The cam serves as a bearing retainer in the same manner as the head of the cap screw 25 (Figure 3) associated with the sleeve 38. Due to the planetary gearing, the drum 28 rotates relative to the cam 87 which rotates at the speed of the driving sleeve 38. The drum 28 carries the resiliently mounted contacts 31a and 31b in the same manner as illustrated in Figure 4, while the contacts 32a and 32b are respectively mounted on stiff resilient arms 88a and 88b. At their outer ends each of the resilient arms 88a and 88b is provided with a cam follower 89 adapted to engage the periphery of cam 87. A loading spring 90 is associated with each arm and urges the respective cam followers 89 into contact with the cam 87. Adjustable stop screws 91 are associated with each of the resilient arms 88a and 88b in a position directly beneath the contacts 32a and 32b respectively, to limit the deflection of the arms 88a and 88b at the point of contact. The loading springs 90 and stop screws 91 are suitably insulated and supported by brackets from the wall of the drum 28.

The cam 87 is preferably made with an enlarged radial portion and a depressed flattened portion so that once during each revolution of cam 87 relative to drum 28, the resilient arms 88a and 88b and their associated contacts 32a and 32b will be oscillated. The roller 36 carried by the arm 21 is adapted to engage either of contacts 31a or 31b to thereby cause engagement by these contacts with contacts 32a or 32b, respectively. The contacts 32a and 32b are respectively electrically connected to slip rings on drum 28 so as to directly transmit current to brushes 26a and 26c respectively, the electrical connections otherwise being the same as illustrated in Figure 5 or Figure 6.

The operation of the device of Figures 8 and 9 is as follows:

Upon the occurrence of any difference in speed between a respective engine and the constant speed motor 13 associated with a respective synchronizer unit, the arm 21 will either lag or lead with respect to the drum 28, so that the roller 36 will engage one of the resiliently mounted contacts 31a or 31b, causing an engagement with the associated contacts 32a or 32b, to thereby complete an electrical circuit through the pitch-changing motor to cause a propeller pitch adjustment in the manner heretofore described. However, if the speed difference is of short duration or small in magnitude, the cam 87 will continuously interrupt the engagement between the pairs of contacts 31a—32a, or 31b—32b, respectively, so that the supply of power to the pitch-changing motor will be continuously interrupted, giving a step-by-step propeller pitch adjustment in the same manner as the device of Figures 3 and 4. If, however, the speed difference is of greater magnitude or longer duration, the roller 36 will cause a deflection of the resilient arms 88a or 88b sufficient to cause the cam follower 89, associated therewith, to move out of the path of contact with the cam 87, allowing the contacts 31a—32a, or 31b—32b, to remain engaged, thus continuously supplying current to the pitch-changing means until synchronism is approached. Upon the cam follower engaging the cam, the mechanical interrupter again becomes active, causing a step-by-step approach to final synchronization. The magnitude and duration of the speed difference necessary to cause a changeover from interrupter action to continuous current supply is determined by adjustment of the stop screws 71. By variation in the shape of the cam 87, the duration of the "makes" and "breaks" of the power circuit may be adjusted, and it further will be noted that the cam 87 may, if so desired, be mounted to rotate with the gear 18 driven by the constant speed motor 13. The principal advantage of the device of Figures 8 and 9 over the device disclosed in Figures 3 and 4 lies in the fact that the mechanical interrupter eliminates two pairs of electrical contacts, thus simplifying electrical maintenance and reducing the possibility of electrical failure due to sticking contacts.

The device of Figures 8 and 9 is thus seen to provide a synchronizing mechanism which will cause a gradual change of propeller pitch for relatively small deviations from absolute engine synchronism, and provide a rapid change in propeller pitch for larger deviations from absolute synchronism, similar to the devices above described with reference to Figures 1 to 7, inclusive.

Although the description is specific to the illustrations in the drawings, it is to be understood that there may be numerous departures therefrom which will still be within the field and scope of my invention, so that I do not wish to be restricted thereto, but only insofar as the appended claims are so limited.

What I claim is:

1. In combination, an engine, a propeller for absorbing the power of said engine, power-actuated means for changing the pitch of said propeller, means driven by said engine at a speed proportional thereto, means driven at a constant speed, and power-supply-control means for controlling the supply of power to said pitch-changing means, said power-supply-control means including a pair of relatively angularly displaceable members, one of said members being driven by said constant-speed-driven means and the other of said members being driven by said engine-driven means, said members cooperating upon a predetermined relative angular displacement of said members in either direction to cause power to be supplied to said power-actuated pitch-changing means, and interrupter means carried by one of said members and operative upon a predetermined relative angular displacement of said members to interrupt the supply of power to said pitch-changing means, said interrupter being rendered ineffective upon a further predetermined relative angular displacement of said members, whereby power is continuously supplied to said pitch-changing means.

2. The structure as claimed in claim 1, in which one of said members carries two sets of contacts, each operative to control the supply of electric power to said power-actuated pitch-changing means, each of said sets of contacts including a pair of normally spaced resiliently mounted electrical contacts, an element carried by the other of said members operative to cause engagement of either of said pairs of contacts upon a predetermined relative angular displacement of said members in either direction, said interrupter means being operative to interrupt the passage of current through each of said pairs of contacts, respectively, and said interrupter means being rendered effective or ineffective by said element.

3. In a synchronizing device, an engine-driven shaft, a constant-speed-driven shaft, a first member driven by one of said shafts, a second member driven by the other of said shafts, two sets of electrical contacts carried by said first member, each of said sets including a pair of resiliently mounted contacts arranged in spaced relation, the mounting for one of the contacts of each of said pairs including a resilient arm and a cam follower secured to said arm, an element carried by said second member and operative upon a predetermined relative angular displacement of said members to cause engagement of the contacts of one of said pairs of contacts, a cam carried by one of said members and relatively rotatable with respect thereto, said cam cooperating with said cam followers to interrupt the said engagement between said contacts upon speed differences of a comparatively short duration between said shafts, said element upon a speed difference of a comparatively longer duration causing a respective cam follower to be moved out of the path of contact with said cam to allow a continuous engagement between the contacts of the said one of said pairs of contacts.

4. In apparatus of the character described, a shaft, a member rotatably mounted on said shaft, gearing connecting said member and said shaft, cam means mounted on said shaft and rotatable relative to said member, a pair of resilient arms mounted on said member, cam followers on each of said arms normally in contact with said cam, an electrical contact mounted on each of said arms, a pair of resiliently mounted contacts carried by said member, each associated with one of said first-named contacts, a second shaft concentric with said first-named shaft, an element carried by said second shaft and operative upon a predetermined relative angular displacement of said shafts to cause an initial engagement between the contacts of one of said pairs of contacts, said cam causing interruption of said engagement and said element being operative upon a further predetermined relative angular displacement of said shafts to deflect one of said arms to lift the associated cam follower out of the path of contact with said cam to thereby cause continued engagement between the contacts of said one of said pairs of contacts.

5. In combination, a pair of shafts; constant speed means for driving one of said shafts; electrical means for controlling the speed of the other of said shafts, including two sets of contacts rotated by one of said shafts; an element driven by the other of said shafts interposed between said sets of contacts and operative upon a predetermined relative angular displacement of said shafts to cause engagement between the contacts of one of said sets of contacts; cam means continuously rotatable relative to said sets of contacts and driven by one of said shafts; cam followers associated with each of said sets of contacts and normally engaging said cam to continuously interrupt the said engagement between the contacts of one of said sets during speed differences of a comparatively short duration between said shafts; and means controlled by said element for lifting a respective one of said cam followers out of the path of contact with said cam to cause continued engagement between the contacts of the said one of said sets of contacts upon the occurrence of speed differences of a comparatively longer duration between said shafts.

6. A device for synchronizing the speed of an engine having adjustable speed-controlling means with the speed of a constant speed means, comprising a pair of rotatable and co-axially mounted members adapted to be driven in the same direction, means for rotating one of said members at a constant speed, a contactor connected for rotation with the constant-speed-driven member and a pair of contact point means, each including an electrical interrupter mounted for rotation with the other of said members such that one or the other of said interrupters is rendered operative during differences in the speeds of said members to obtain interrupted operation of said speed-controlling means.

7. A device for synchronizing the speed of an engine having adjustable speed-controlling means with the speed of a constant speed means, comprising a pair of rotatable and co-axially mounted members, a pair of gear mechanisms for rotating said members in the same direction, means for rotating one of said gear mechanisms at a constant speed, a contactor connected for rotation with the constant-speed-driven member and a pair of contact point means, each including an electrical interrupter mounted for rotation with the other of said members such that one or the other of said interrupters is rendered operative by change in the speeds of said members to obtain interrupted operation of said speed-controlling means.

8. In combination, an engine, a propeller for absorbing the power of said engine, means for changing the pitch of said propeller, including a source of power supply, means driven at a constant speed, means driven from said engine, and means operative by a relative angular displacement between said driven means to control said source of power supply and thereby vary the pitch of said propeller in such a manner as to synchronize the speed of said engine with said constant speed means, said means including a make-and-break device having a kick coil, said kick coil intermittently breaking current flow during small rate of change in the speeds of said driven members, but being inoperative during large rate of change in the speeds of said driven members.

9. In combination, an engine, a propeller for absorbing the power of said engine, means for changing the pitch of said propeller, including a source of power supply, means driven at a constant speed, means driven from said engine, and propeller-pitch-control means operative in response to the speed differences of said driven members to vary the pitch of said propeller in such a manner as to synchronize the speed of said engine with said constant speed means, including a power supply interrupter carried by one of said driven members and operative by the other of said driven members upon a relative angular displacement therebetween.

10. In combination, an engine, a propeller for absorbing the power of said engine, means for changing the pitch of said propeller, including a source of power supply, means driven at a constant speed, means driven from said engine, and propeller-pitch-control means operative in response to the speed differences of said driven members to vary the pitch of said propeller in such a manner as to synchronize the speed of said engine with said constant speed means, including means carried by one of said driven members and operative by the other of said driven members to interrupt said power supply upon a relative angular displacement therebetween and to thereafter maintain continuous power supply upon additional angular displacement therebetween.

11. In a synchronizing device, a pair of relatively rotatable members rotatable in the same direction, means for controlling the speed of one of said members, comprising a reversible electric motor, a pair of electrical supply circuits, one of said circuits serving to operate said motor in one direction, and the other in the opposite direction, each circuit including three contacts operatively associated with said members, an interrupter connected in said circuit and in series with two of said contacts for effecting a multiplicity of making and breaking of said circuit to cause an impulse rotation of said motor upon initial engagement of said two contacts caused by relative predetermined angular displacement of said members and adapted to be shunted by engagement between the third contact and one of said first two mentioned contacts, upon further relative angular displacement of said members.

HOWARD H. COUCH.